July 27, 1965

R. M. LEFEVER 3,196,811

OVEN LOADER

Filed July 26, 1962

INVENTOR.
RICHARD M. LEFEVER
BY
*Otto Maeller*
Attorney

July 27, 1965   R. M. LEFEVER   3,196,811
OVEN LOADER

Filed July 26, 1962   3 Sheets-Sheet 3

*INVENTOR.*
RICHARD M. LEFEVER
BY
*Otto Moeller*
Attorney 3,196,811
OVEN LOADER
Richard M. Lefever, York, Pa., assignor, by mesne assignments, to Baker Perkins, Inc., New York, N.Y., a corporation of New York
Filed July 26, 1962, Ser. No. 212,562
11 Claims. (Cl. 107—57)

This invention relates to loading devices for introducing into an oven of the type employed in large commercial bakeries, individual pans or groups of pans containing proofed dough, and more particularly wherein successive rows of pans are brought into position in front of the oven loading opening by a transversely traveling endless conveyor.

An object of the invention is to provide a compact, efficient loading device including a pusher bar operating in a loading path for moving a row of pans delivered in front of the oven by a transversely traveling endless conveyor into the oven, and in a retracting path at an elevation over a succeeding row of pans being delivered by the conveyor, and wherein the pusher bar is positively guided throughout its path of travel, to provide a particularly smooth and controlled operation of the pusher bar throughout its path of travel.

Another object is to provide a loading device of the type described above including longitudinally extending endless chains for operating the pusher bar and having adjustable chain tensioning means associated therewith arranged to provide for adjusting the tension in the chains without affecting the path of travel of the pusher bar and wherein the pusher bar is maintained in positively guided position throughout its path of travel.

In modern high production bakeries, ovens are adapted to bake six thousand and more loaves of bread per hour necessitating a loading device for feeding pans of dough into the oven at a high rate. It is furthermore important to deliver the pans of proofed dough into the oven in as gentle and smooth a manner as possible since proofed dough is sensitive to shock, frequently resulting in a poor or unsalable loaf of bread. It is therefore another object of the invention to provide an oven loading device capable of high loading capacity and that subjects the pans of proofed dough to a minimum of shock and rough handling. This is accomplished by a novel loading device incorporating a pair of pusher bars alternately moving a row of pans into the oven. Thus for the same capacity, the novel loading device provides for operating the pusher bars at half the speed of the single pusher bar of prior loading devices, thus reducing the impact of the pusher bars against the pans of dough at the beginning of a loading operation and providing smoother travel of the pans of dough into the oven.

Other features of the invention reside in the particular construction and arrangement of parts in a two pusher bar loader whereby the one pusher bar on its retracting stroke clears the other pusher bar and its connection with the operating chains as its travels on its loading stroke.

Other objects and advantages more or less ancillary to the foregoing and the manner in which all of the various objects of the invention are realized, will become apparent in the following description when considered in connectio with the accompanying drawings.

Figure 1:
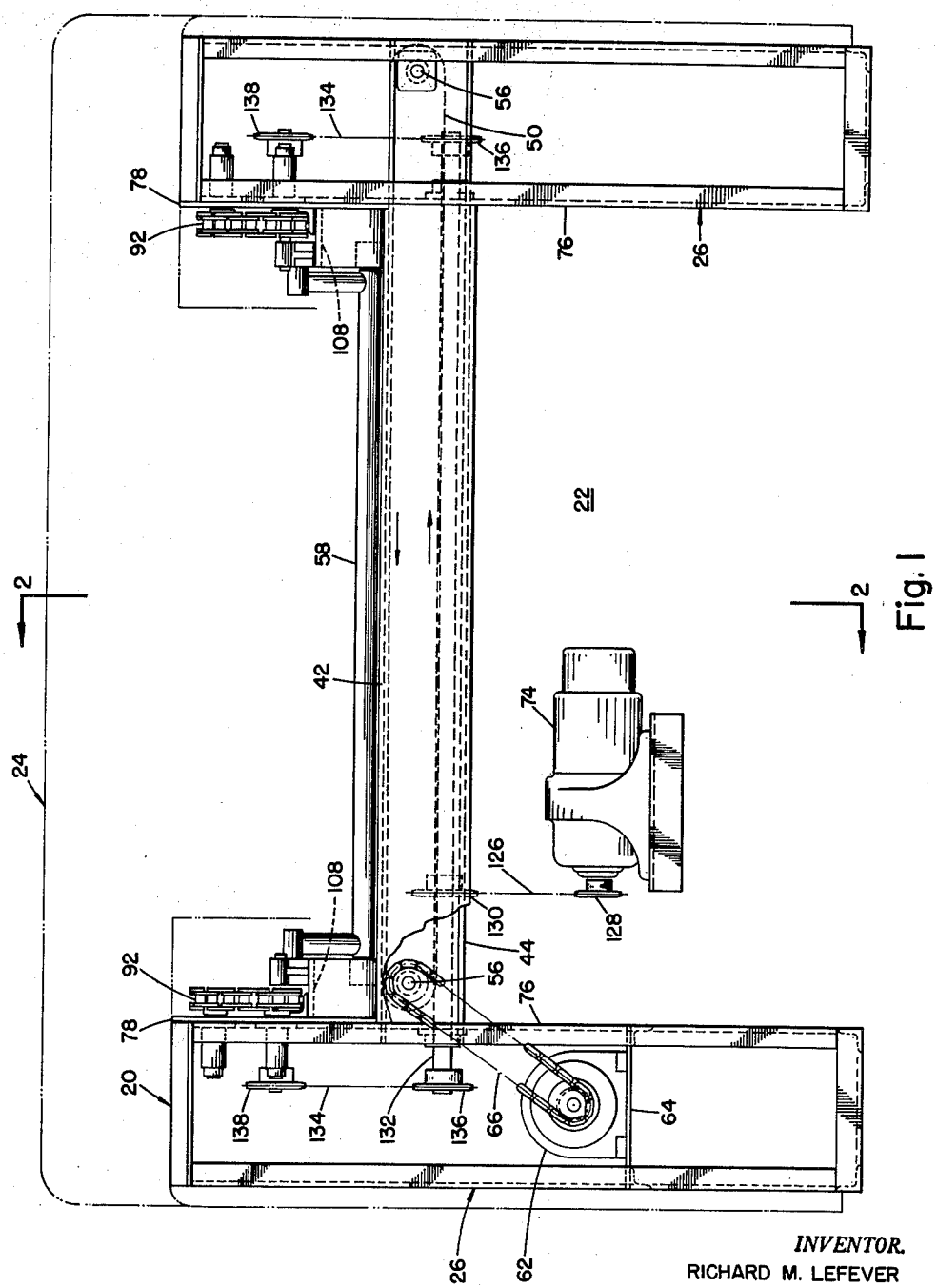
FIGURE 1 is a view in front end elevation of the loading device embodying the present invention, and shown in operative relation to a baking oven.
Figure 2:
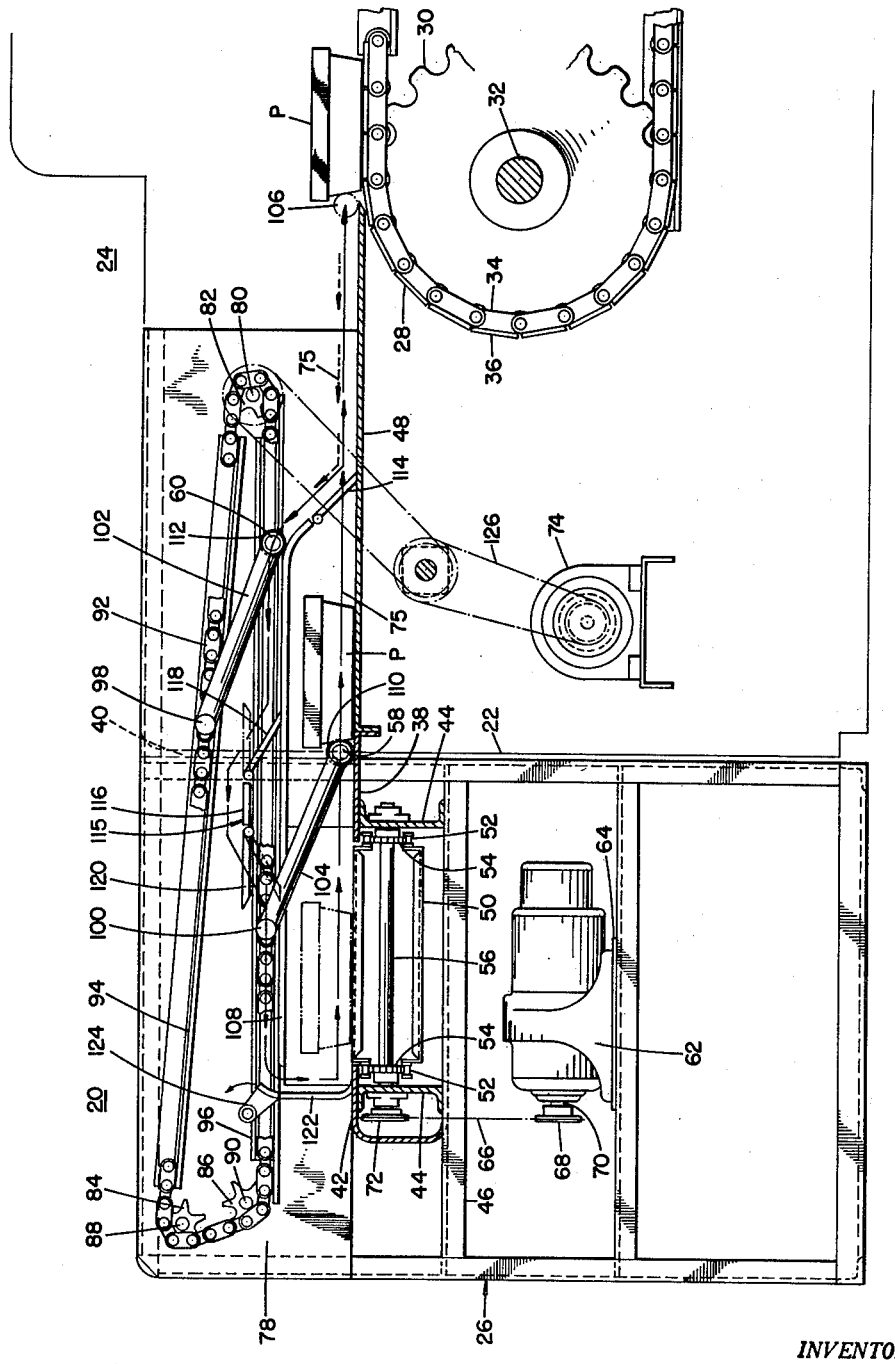
FIGURE 2 is a vertical longitudinal sectional view through the loading device and the forward end portion of a baking oven, taken on the line 2—2 of FIGURE 1.

Referring to the drawings, and more particular to FIGURES 1 and 2, the loading device 20 is arranged to be disposed against the front wall 22 of an oven 24, and includes a generally rectangular upright supporting structure or frame 26 made up of angle irons and other structural elements.

The upper portion of the loading device 20 projects rearwardly of the front wall 22 of the oven 24 for pushing pans of dough P onto an articulated traveling hearth 28. The articulated traveling hearth 28 is led at one end around a pair of laterally spaced conveyor sprockets, one such sprocket 30 at the far side of the oven being shown in FIGURE 2 the sprockets 30 being mounted on a transversely extending shaft 32 disposed in the lower forward portion of the oven 24. A similar shaft and sprocket arrangement, not shown, is provided for the other end of the articulated traveling hearth in the lower rearward portion of the oven. The sprockets 30 and the similar sprockets at the other end of the oven have conveyor chains 34 trained thereover carrying hearth members 36, which may be of conventional plate or grid construction, arranged to be articulately connected by the conveyor chains so that the hearth members 36 in the upper run of chain will produce a substantially continuous oven floor.

The loading device includes a substantially horizontal pan support 38 adjacent the lower marginal edge of a loading opening 40 in the front wall 22 of the oven. The pan support 38 includes an outer pan support section 42 supported on a pair of transversely extending, longitudinally spaced channel beams 44 spanning and carried by longitudinal frame members 46 of the frame 26. The pan support 38 also includes an inner pan support section 48 rigidly or hingedly connected to the rearward end of the outer pan support section 42 and extends therefrom inwardly of the oven to the upper run of the traveling hearth 28. The loader functions, as will be described hereinafter, to push the pans from the outer pan support section 42 across the inner pan support section 48 onto the traveling hearth 28 of the oven.

The outer pan support section 42 includes a transversely extending conveyor 50, preferably of the endless type, for delivering successive rows of pans into position in front of the oven preparatory to being loaded into the oven. As shown, the conveyor 50 is of the slat type, the slats of which are attached at their ends to a pair of spaced transversely extending endless chains 52. Each of the chains 52 is trained at one end around a sprocket 54 at one side of the loading device, and at its other end around a similar sprocket (not shown) at the opposite side of the loading device. The sprockets 54 are fixed on shafts 56 journaled in suitable bearings carried by the channel beams 44.

As shown in FIGURE 1, the right hand end of the conveyor 50 extends to the outermost side of the frame 26, for receiving pans, preferably from another conveyor, not shown, so that with the conveyor 50 traveling in the direction of the arrows, successive rows of pans are moved into position in front of the loading opening 40 of the oven for engagement by one or the other of the pusher bars 58 and 60 of the loading device. The conveyor 50 is operated by a motor 62 mounted on a bracket 64 carried by the frame 26, and the drive means includes a chain 66 trained over a sprocket 68 on the motor shaft 70 and a sprocket 72 on an extension of one of the conveyor shafts 56, in the present instance the conveyor shaft at the left, as viewed in FIGURE 1.

Suitably mounted in the lower portion of the oven 24 between front wall 22 and the forward end of the traveling hearth 28 is a motor 74 for actuating the pusher bars 58 and 60 which are caused to be moved, by means hereinafter described, in a rearward direction or pan pushing stroke along a lower run in relatively close proximity to the surface of the pan support 38, and are further caused to be moved in a forward direction or retracting stroke a short distance in the same path and then in a path above the level of the pans, in a cyclic manner, as indicated by the arrows 75 in FIGURE 2.

Disposed at opposite sides of and suitably secured to inner frame members 76 of the loading device supporting frame 26 are a pair of vertical longitudinally extending plates 78. The plates 78 are transversely spaced a distance apart sufficient to receive therebetween the pusher bars 58 and 60 and elements of the operating means therefor, as best shown in FIGURE 1. The plates 78 are disposed directly over the upper surface of the pan support 38 and as shown in FIGURE 2 terminate at their rearward ends somewhat short of the rearward end of the inner pan support section 48.

The operating means for the pusher bars 58 and 60 is hereinafter described more particularly with reference to one of the plates 78, it being understood that a similar arrangement of parts is provided adjacent the other of the plates 78. Extending through the plate 78 near the rearward end thereof and journaled in a suitable bearing carried by the plate 78 is a short horizontal transversely extending shaft 80. Fixed on the shaft 80 adjacent the inner side of the plate 78 is a turning sprocket 82. A pair of similar vertically spaced turning sprockets 84 and 86 are disposed adjacent the inner side of the plate 78 near the forward end thereof, being fixed on short horizontal transversely extending shafts 88 and 90 journaled in suitable bearings carried by the plate 78. Trained around the sprockets 82, 84 and 86 is an endless, driven chain 92.

Figure 5:
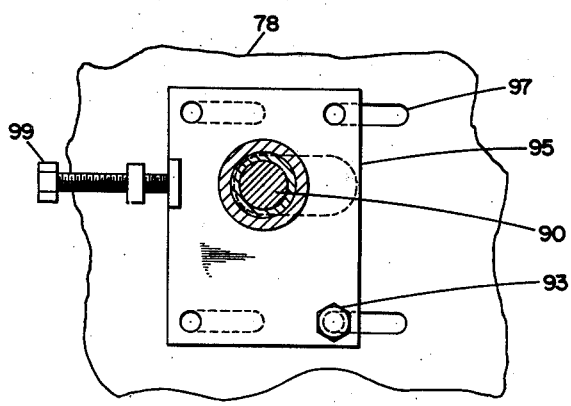
FIGURE 5 is an enlarged fragmentary view of the lower rear sprocket chain tensioning adjusting means.

Means is associated with the lower forward sprocket 86 for adjusting the tension in the chain 92. For this purpose, referring to FIGURE 5, the bolts 93 securing the bearing 95, wherein shaft 90 is journaled, to the plate 78 extend through longitudinally elongated slots 97 in the plate 78 and a conventional screw adjustment, as indicated at 99, associated with the bearing 95 is arranged to selectively adjust the bearing 95 to provide the desired tension in the chain 92. Shaft 90 protrudes from bearing 95 into an elongated slot in plate 78.

The sprockets 82 and 86 are so disposed to provide in the chain 92 a lower horizontal run spaced a vertical distance above the level of the pan support 38 somewhat greater than the height of the pans P. The sprocket 84, which is spaced a distance above the sprocket 86, provides in the chain 92 an upper run sloping downward from sprocket 84 to sprocket 82. The upper run of the chain 92 is guided on a longitudinally extending track 94 and the lower run of the chain is guided in a longitudinally extending track 96. The tracks 94 and 96 are supported in any suitable manner on the inner side of the plate 78. As viewed in FIGURE 2, the chain 92 is arranged to travel in counter clockwise direction.

Secured to the chain 92 and extending laterally inward therefrom are a pair of equidistantly spaced pintles 98 and 100, on the free ends of which are pivotally mounted one end of respective arms 102 and 104. As before stated, the above arrangement is duplicated at the opposite side of the loading device, as is evident from FIGURE 1. With this in mind, it will be seen that the ends of the arms 104 opposite their pivotally mounted ends are rigidly secured to the pusher bar 58 adjacent the opposite ends thereof. In similar manner, the arms 102 opposite their pivotally mounted ends are rigidly secured to the pusher bar 60 adjacent the opposite ends thereof.

The arms 102 and 104 are of substantially greater length than the vertical distance between the lower runs of the chains 92 and the pan support 38, so that when the pivotally mounted ends of the arms 102 and 104 reach the rearward end of the lower horizontal runs of the chains 92, the pusher bars 58 and 60 will extend a considerable distance therebeyond to the position shown in phantom at 106 to push a row of pans P onto the traveling hearth 28. Now, when the pivotally mounted ends of the arms 102 and 104 are moved along the upper runs of the chains 92, the pusher bars 58 and 60 are retracted and travel along the rearward portion of the pan support section 48 in a path indicated by the broken arrows 75 in FIGURE 2.

Figure 3:
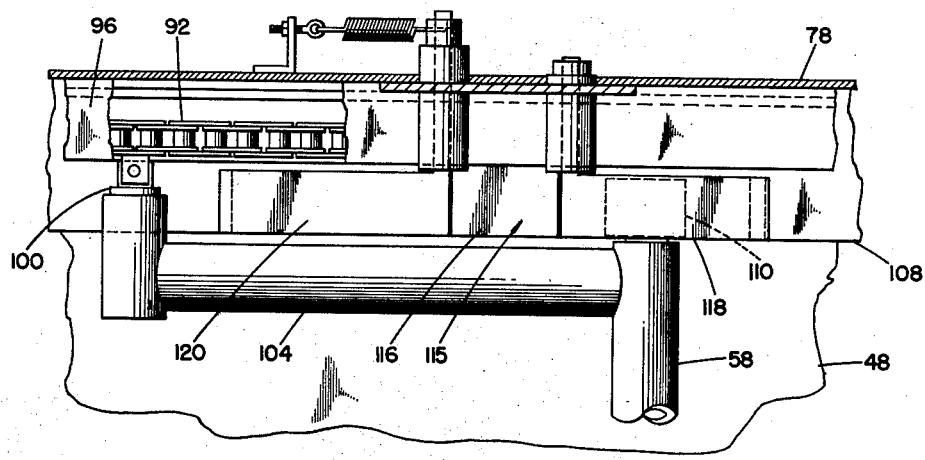
FIGURE 3 is an enlarged fragmentary plan view of one side of the loader showing the connection between a pusher bar and its operating chain and the switching means for the pusher bar on its retracting stroke.

Again referring to the arrangement and construction of elements adjacent one of the plates 78, it being understood that this is duplicated at the other of the plates 78, a horizontal longitudinally extending guide track 108 is suitably secured to the inner side of the plate 78 subjacent the lower run of the chain 92 but at an elevation above the surface of the pan support 38 somewhat greater than the height of a pan P. As best shown in FIGURES 1 and 3, the guide track 108 projects laterally inward of the plate 78 beyond the chain 92 and terminates at its inner longitudinal edge short of the pusher arms 102 and 104 so that as the pusher bars traverse the pan support 38, the arms 102 and 104 clear the track 108. The pusher bars 58 and 60 are provided respectively with projecting end portion or abutments preferably in the form of rollers 110 and 112, arranged on the retracting stroke of the pusher bars 58 and 60 to engage the guide track 108 to thereby carry the pusher bars over pans on the conveyor 50 and to permit one pusher bar, for example pusher bar 60 in FIGURE 2, to travel over pans P as those pans are being pushed across the forward portion of pan support section 48 by pusher bar 58.

In order to permit the pusher bars 58 and 60, on their retracting stroke, to move upwardly from the level of the pan support 38 to the level of the guide tracks 108, the latter are provided at their rearward ends with downwardly biased hinged track switches 114. Referring to FIGURE 2, showing a track switch 114 at one side of the loading device, it will be observed that the rollers 110 and 112 engage and pass under the track switch 114 on the pushing stroke of the pusher bars 58 and 60, and roll upwardly along the track switch 114 on the retracting stroke of the pusher bars 58 and 60.

In order to permit the roller extensions of one of the pusher bars, for example, the roller extensions 112 of the pusher bar 60, to pass over and clear the inwardly projecting pintles 100 to which the arms 104 of the pusher bar 58 are pivotally attached, upon continued travel of the pusher bars 58 and 60 from their positions as shown in FIGURE 2, means is provided at the inner side of each of the plates 78, which means will now be described with reference to one of the plates 78. At the location where the roller extension of one pusher bar passes the pintle of the other pusher bar, there is provided a diverting track 115 comprising a short horizontal track section 116. The track section 116 is secured in suitable manner to the inner side of the plate 78 at an elevation above the track 108 between the upper and lower runs of the chain 92, and projects inwardly a short distance beyond the chain 92. The diverting track 115 also includes a downwardly biased track switch 118 hingedly attached to the rearward end of the track section 116 inwardly of the chain 92 and an upwardly biased track switch 120 hingedly attached to the forward end of the track section 116 inwardly of the chain 92, as best shown in FIGURES 2 and 3. Thus, on the pushing stroke of the pusher bars 58 and 60, the pintles 98 and 100 pass under the normally raised track switch 120 and upon engagement with the downwardly biased track switch 118, lift the same and pass thereunder. On the retracting stroke of the pusher bars 58 and 60, the roller extensions 110 and 112 ride upwardly along the downwardly biased track switch 118 from the track 108, then ride along the innermost portion of the horizontal track section 116, and then depress the upwardly biased track switch 120 to ride downwardly therealong back to the track 108.

Still referring to one side of the loading device, it being understood that a similar arrangement is provided at the other side, the forward end of the track 108 terminates at a point such that when the pivotally mounted ends of arms 102 and 104 round the sprocket 84, the rollers 112 and 110 move off the track 108 to return the pusher bars 60 and 58 down to the pan support 38. In order to prevent free fall of the pusher bars 60 and 58 and to thereby eliminate undesirable banging, an upright guide plate 122 is disposed forward of the forward end of track 108 a distance slightly greater than the diameter of the rollers 112 and 110. The upper end of guide plate 122 is provided with a pivotally mounted downwardly biased arcuate guide member 124 in the path of the rollers 112 and 110 for guiding the pusher bars 60 and 58 downwardly as the pivotally mounted ends of the arms 102 and 104 round the sprocket 84.

Figure 4:
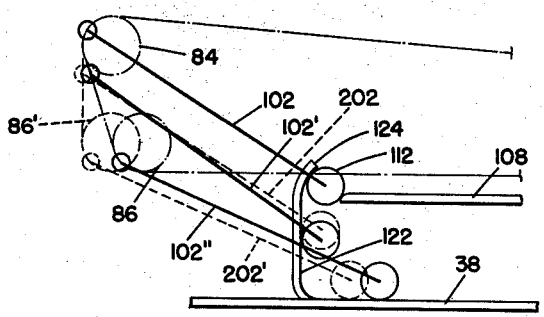
FIGURE 4 is a diagrammatic view showing the path of the pusher bar in several different positions as it is guided from an upper to a lower track at the end of its retracting stroke, in different positions of the lower rear sprocket of the pusher bar operating chain.

Referring particularly to FIGURE 4, diagrammatically showing one of the arms 102 in several successive positions, the path followed by the pivotally mounted end of arm 102 as it rounds the upper sprocket 84 and the arcuate guide member 124 are parallel arcs having the same radius of curvature and are spaced a radial distance apart equal to the distance between the axis of the pivotally mounted end of the pusher arm 102 and the nearest point on the circumference of the pusher bar roller 112, so that as the pivotally mounted end of the arm 102 rounds the upper sprocket 84, the roller 112 will engage and be guided downwardly along the arcuate guide member 124 to thereby prevent appreciable free swinging downward movement of the pusher bar 60. As the pivotally mounted end of the arm 102 continues in its path toward the lower sprocket 86, the arm 102 successively assumes the positions 102' and 102" with the roller 112 riding downwardly in engagement with the guide plate 122. There is thus provided a smooth and gentle transfer of the pusher bar 60 from the track 108 to the pan support 38. The pivotally mounted guide member 124 is arranged to swing upwardly in the direction of the arrow in FIGURE 2 when engaged by the pintles 100 and 98 on the pushing stroke of the pusher bars 60 and 58, to permit them to pass thereunder.

As previously noted, at the forward end of the chain drive for the pusher bars 58 and 60, the chains 92 are trained over a pair of vertically spaced sprockets 84 and 86 fixed on their respective shafts 88 and 90. The lower shafts 90 with their sprockets 86 are normally disposed a horizontal distance rearward of the upper shafts 88 and their sprockets 84 as clearly shown in FIGURES 2 and 4. The significance of this construction will now be explained.

It is important, in order to effect at all times smooth operation of the pusher bars, to provide in the chain drive therefor, adjustable chain tensioning means. Were the chain tensioning means, above described, to be applied to the shafts 80 and their sprockets 82, it is evident that adjustment thereof would be difficult of access and would also alter the position of the pusher bars at the ends of their pushing strokes so that pans might hang on the end of the inner pan support section 48. On the other hand, if the chain tensioning means is associated with a large single sprocket at the forward end of each of the chains 92 or with the upper sprockets 84 of the two vertically spaced sprockets 84 and 86, adjustment thereof changes the relation of the pusher bars with the guide plates 122 and the forward ends of the guide tracks 108 as the pivotally mounted ends of the pusher bar arms round the sprockets.

Referring particularly to FIGURE 4, it will be seen that with the lower sprockets 86 disposed a horizontal distance rearward of the upper sprockets 84, the lower sprockets may be adjusted by the chain tensioning means to the position, for example, shown in phantom at 86', without changing the relative position of the pusher bar roller extension 112 with respect to the guide plate 122 and the forward end of the guide track 108 as the pivotally mounted end of the pusher bar arm 102 rounds the sprocket 84. As the pivotally mounted end of pusher bar arm 102 continues in its path toward the lower sprocket 86', the arm 102 successively assumes the positions 202 and 202', as distinguished from positions 102' and 102" assumed with the sprocket 86 in the full line position, with the pusher bar roller extension riding downwardly in engagement with the guide plate 122.

The drive for the chains 92 includes a sprocket chain 126 trained around a sprocket 128 on the drive shaft of motor 74 and a sprocket 130 on transverse through shaft 132 journaled in suitable bearings at opposite sides of the oven 24, and sprocket chains 134 trained around sprockets 136 on the ends of through shaft 132 and sprockets 138 on extensions of the shafts 80.

It will be evident that the double pusher bar arrangement, as above described, permits high capacity loading of the oven without operating the chains 92 at excessive rates of speed. This is of particular importance where the pans must be pushed a considerable distance from the pan infeed conveyor 50 to the traveling hearth of the oven. The slower operation of the pusher bars furthermore permits transporting of the products to be baked in a smoother and gentler manner, minimizing jarring of the pans. This is particularly important in the handling of products such as proofed dough, since rough handling thereof frequently causes collapse of the proofed dough resulting in a poor or unsalable load of bread.

I claim:

1. An oven loading device comprising a horizontal pan support at the entry end of the oven including a conveyor for feeding a row of pans transversely in front of said oven; a pair of longitudinally extending laterally spaced elevated tracks bridging an intermediate portion of said pan support including said conveyor; a pair of transversely extending pusher bars; actuating means for imparting cyclical reciprocating movement to said pusher bars, in a pushing path traversing said pan support in close proximity to the upper surface thereof to push pans from said conveyor into said oven and in a retracting path along said elevated tracks, said means including means so connecting said actuating means and said pusher bars as to move said pusher bars in mutually opposite paths; and switching means associated with said elevated tracks engaging the ends of a pusher bar traveling along its retracting path to elevate said pusher bar over a pusher bar traveling along its pan pushing path and over the pans being pushed thereby.

2. An oven loading device comprising a horizontal pan support at the entry end of the oven including a conveyor for feeding a row of pans transversely in front of said oven; a pair of longitudinally extending laterally spaced elevated tracks bridging a portion of said pan support including said conveyor; a pair of transversely extending pusher bars; actuating means for imparting cyclical reciprocating movement to said pusher bars, in a loading path traversing said pan support in close proximity to the upper surface thereof to push pans from said conveyor into said oven and in a retracting path along said tracks; said actuating means including a pair of parallel laterally spaced endless chains adjacent said tracks defining closed loops having upper and lower runs, with the lower runs thereof also bridging said pan support portion and means operatively connecting said pusher bars to opposite runs of said chains to move said pusher bars in mutually opposite paths; and switching means associated with said elevated tracks for engaging the ends of a pusher bar traveling along its retracting path to elevate said pusher bar over a pusher bar traveling along its loading path, its connections with said chains and the pans being pushed thereby.

3. An oven loading device comprising a horizontal pan support at the entry end of the oven; a pair of longitudinally extending laterally spaced tracks at an elevation such as to clear any pans on said support; a pair of transversely extending pusher bars; actuating means for imparting cyclical reciprocating movement to said pusher bars in a loading path traversing said pan support in close proximity to the upper surface thereof to push pans from said support into said oven and in a retracting path along said tracks; said actuating means including a pair of parallel laterally spaced endless chains adjacent said tracks defining closed loops having upper and lower runs, with the lower runs thereof disposed slightly above the level of said tracks and means pivotally connecting said pusher bars to opposite runs of said chains to move said pusher bars in mutually opposite paths; and switching means associated with said elevated tracks for engaging the ends of a pusher bar traveling along its retracting path to elevate said pusher bar over a pusher bar traveling along its loading path, its pivotal connections with said chains and the pans being pushed thereby.

4. An oven loading device comprising a horizontal pan support associated with the entry end of the oven; a pair of longitudinally extending laterally spaced tracks disposed above said support at an elevation such as to be above any pans on said support; transversely extending pan pushing means and actuating means therefor to impart cyclical reciprocating movement thereto, in a rearward loading path traversing said pan support in close proximity to the upper surface thereof to push pans from said support into said oven and in a retracting, forward path along said elevated tracks; said actuating means including a longitudinally elongated endless chain adjacent each of said tracks defining closed loops having upper and lower runs, sprocket means above the rearward end of each of said tracks and a pair of vertically spaced sprockets above and spaced forward of the forward end of each of said tracks over which said chains are trained, the lower sprocket of each pair of vertically spaced sprockets being offset rearwardly of the upper sprocket of each pair of vertically spaced sprockets, means connecting said chains with the opposite ends of said pan pushing means, and horizontally adjustable chain tensioning means associated with the lower sprocket of each pair of vertically spaced sprockets.

5. An oven loading device comprising a horizontal pan support at the entry end of the oven including a conveyor for feeding a row of pans transversely in front of said oven; a pair of longitudinally extending laterally spaced tracks bridging an intermediate portion of said pan support including said conveyor; a track switch hingedly connected to the forward end of each of said tracks and resting at its free end on said pan support; a transversely disposed pusher bar; means for imparting reciprocating movement to said pusher bar, in a rearward direction to traverse said pan support in close proximity to the upper surface thereof for pushing pans from said conveyor into said oven, and in a forward direction up said track switches and along said tracks over said conveyor; said means including a pair of longitudinally elongated endless chains respectively offset laterally outward of a respective track and the lower runs thereof being disposed at an elevation above said tracks, a pair of arms respectively offset laterally inward of a respective track, connected at one end with said pusher bar and having at their other ends a pivotal connection with a respective endless chain; and upright guides between said track and said pan support in forward spaced relation at its upper end with respect to the forward ends of said tracks for engaging the ends of said pusher bar as the pivotally connected ends of said arms move from the upper runs of said endless chains toward the lower runs thereof to provide a guide support for said pusher bar as it descends from said tracks to said pan support.

6. An oven loading device comprising a horizontal pan support at the entry end of the oven including a conveyor for feeding a row of pans transversely in front of said oven; a pair of longitudinally extending laterally spaced tracks bridging an intermediate portion of said pan support including said conveyor; a track switch hingedly connected to the forward end of each of said tracks and resting at its free end on said pan support; a transversely disposed pusher bar; means for imparting reciprocating movement to said pusher bar, in a rearward direction to traverse said pan support in close proximity to the upper surface thereof for pushing pans from said conveyor into said oven, and in a forward direction up said track switches and along said tracks over said conveyor, said means including a pair of longitudinally elongated endless chains respectively offset laterally outward of a respective track and the lower runs thereof bridging said conveyor at an elevation above said tracks, sprocket means above the rearward end of each of said tracks and a pair of vertically spaced sprockets above and spaced forward of the forward end of each of said tracks over which said chains are trained and a pair of arms respectively connected at one end with said pusher bar and having at their other ends a pivotal connection with a respective chain; the upper sprocket of each pair of vertically spaced sprockets being so disposed that as the pivotally connected ends of said arms round said upper sprockets the pusher bar leaves the forward ends of said track and the lower sprocket of said pairs of vertically spaced sprockets being offset rearwardly of the upper sprocket of said pairs of vertically spaced sprockets; and horizontally adjustable chain tensioning means associated with the lower sprocket of said pairs of vertically spaced sprockets whereby the tension in said chains may be adjusted without affecting the forward extent of travel of the pusher bar and its relation with the forward ends of said tracks at the end of its retracting stroke.

7. Loading apparatus for moving articles such as pans along a path to an oven or the like, said apparatus comprising a pair of pusher members; driving means connected to said members for reciprocating them simultaneously in mutually opposite directions; track means supported at a level for engaging and guiding said pusher members in their movements; and switching means associated with said track means and engageable by each of said pusher members upon movement thereof in one of said directions for shifting the latter out of the path of the other pusher member.

8. Loading apparatus for moving articles such as pans along a path to an oven or the like, said apparatus comprising endless driven means; a pair of pusher members connected at spaced intervals to said driven means; means for driving said driven means orbitally whereby one of said pusher members moves along a loading stroke in one direction and the other pusher member moves along a return stroke in the opposite direction; track means supported at a level above said path for engaging and guiding said pusher members in their movements; and switch means supported at such position in the path of a pusher member moving along said return stroke as to divert the latter from said track means and permit passing of said pusher members without interference therebetween.

9. Loading apparatus for moving articles such as pans to an oven or the like, said apparatus comprising endless driven means; a pair of pusher members connected at spaced intervals to said driven means; means for driving said driven means orbitally whereby each of said pusher members moves along a loading stroke in one direction while the other pusher member moves along a return stroke in the opposite direction, the loading stroke of each of said pusher members occurring at one level, and the return stroke of each of said pusher members initially occurring at said one level; switching means supported in the path of a pusher member on its return stroke and operable to switch the latter to another level out of the path of the pusher member on its loading stroke; and guide means supported in a position to engage a pusher member at the end of its return stroke and guide said member to said one level.

10. Loading apparatus for moving articles such as pans along a path leading to an oven or the like, said apparatus comprising an endless driven member; turning members spaced longitudinally of said path and around which said endless driven member is trained to form upper and lower runs; at least one pusher arm pivotally mounted at one end to said driven member and having an abutment at its other end; means for driving said driven member in one direction whereby the pivoted end of said pusher arm moves orbitally from said upper run to said lower run and vice versa; track means supported above the level of said path and beneath which said abutment travels when said pivoted end of said arm moves along said lower run; means in the path of said abutment for shifting the latter to said track means in response to movement of said pivoted end of said arm along said upper run; and guide means supported for engagement by said abutment as said pivoted end of said pusher arm moves from said upper run to said lower run, said guide means comprising an upstanding member interposed between one of said turning members and the adjacent end of said track means.

11. The apparatus set forth in claim 10 wherein said abutment comprises a roller and wherein said upstanding member is spaced from the adjacent end of said track means a distance only slightly greater than the diameter of said roller.

References Cited by the Examiner
UNITED STATES PATENTS

| | | |
|---|---|---|
| 1,755,404 | 4/30 | Mayers. |
| 1,769,201 | 7/30 | Brandeen et al. _____ 107—57.1 |
| 1,795,352 | 3/31 | Sundbom. |
| 2,252,937 | 8/41 | Link. |
| 2,407,664 | 9/46 | Herrold. |
| 2,436,052 | 2/48 | Mueller. |
| 2,980,038 | 4/61 | Royer. |

ROBERT E. PULFREY, *Primary Examiner.*

J. D. BEIN, *Examiner.*